United States Patent
Choi

(10) Patent No.: US 6,411,595 B1
(45) Date of Patent: Jun. 25, 2002

(54) OPTICAL DISC CARTRIDGE AND DRIVING APPARATUS THEREOF

(75) Inventor: Bi Seok Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/488,537

(22) Filed: Jan. 21, 2000

(30) Foreign Application Priority Data

Jan. 23, 1999 (KR) .............................................. 99-2133

(51) Int. Cl.[7] .............................................. G11B 23/02
(52) U.S. Cl. ....................................... 369/291; 360/133
(58) Field of Search .............................. 369/291, 290, 369/289, 77.2; 360/133; 206/307, 312, 313, 444, 308.1

(56) References Cited

U.S. PATENT DOCUMENTS

| | | | |
|---|---|---|---|
| 4,433,410 A | * | 2/1984 | Siryj et al. ................... 369/291 |
| 4,617,655 A | * | 10/1986 | Aldenhoven ................ 369/291 |
| 4,722,439 A | * | 2/1988 | Grobecker et al. |
| 5,121,278 A | * | 6/1992 | Tanaka et al. .............. 360/133 |

FOREIGN PATENT DOCUMENTS

| | | |
|---|---|---|
| JP | 7320359 | 12/1995 |
| JP | 10144031 | 5/1998 |
| JP | 2000011578 | 1/2000 |
| JP | 2000040325 | 2/2000 |
| JP | 2000040329 | 2/2000 |
| JP | 2000048520 | 2/2000 |
| JP | 2000048521 | 2/2000 |
| JP | 2000067548 | 3/2000 |

* cited by examiner

*Primary Examiner*—David Hudspeth
*Assistant Examiner*—Angel Castro
(74) *Attorney, Agent, or Firm*—Birch, Stewart, Kolasch & Birch, LLP.

(57) ABSTRACT

An optical disc cartridge that is capable of assuring the degree of the freedom in an optical disc and a disc holder. In the cartridge, the optical disc and a tension arm are spaced from each other into more than a minimum height for preventing their mutual interference in consideration of a thickness and a deformation amount of the optical disc. Also, a flange and a case are spaced from each other into more than a minimum height for preventing their mutual interference in consideration of a deformation amount of the disc holder and a thickness of the flange.

17 Claims, 5 Drawing Sheets

OPTICAL DISC CARTRIDGE AND DRIVING APPARATUS THEREOF

BACKGROUND OF THE INVENTION

1. Field of the Invention

This invention relates to an optical disc cartridge for receiving an optical disc and an apparatus for driving the same, and more particularly to an optical disc cartridge that is capable of assuring the degree of freedom in an optical disc and a disc holder. Also, the present invention is directed to an optical disc driving apparatus that is capable of assuring the degree of. freedom in an optical disc and a disc holder upon loading an optical disc cartridge within which the optical disc is received.

2. Description of the Background Art

Generally, an optical disc is classified into a read-only type disc, such as CD-ROM and DVD-ROM, etc., and a recordable type disc, such as WROM(Write Once Read Many) type, rewritable type and RAM type, etc., depending on its rewritable frequency. The recordable optical disc has information recording surfaces weak to a contamination such as dust or fingerprint, or a damage such as scratch as it goes into a high density. For this reason, the recordable optical disc has been received within a cartridge so that it can be protected from a contamination or a damage. Recently, there has been suggested a cartridge which can take out an optical disc from it into the exterior. Such an optical disc cartridge is provided with a disc holder for opening or closing an optical disc receiver defined in its case. This has been disclosed in the International Patent Application No. PCT/KR/9,900,362 filed earlier by the same applicant. As shown in FIG. 1, this patent application includes a disc holder 7 provided with tension arms 2a and 2b, hereinafter referred to as "tension arm-disc holder". The tension arms 2a and 2b grasp an optical disc 10 by an elastic pressure when the optical disc 10 is inserted into a case 1 or is drawn into the exterior. When the optical disc 10 has been fully inserted into the case 1, these tension arms 2a and 2b are separated from the optical disc 10 while being outstretched by guide ribs la and 1b defined in the case 1. The optical disc 10 which becomes free from a restraint of the tension arms 2a and 2b within the case 1 can be rotated in the recording/reproduction mode.

The tension arms 2a and 2b must assure the degree of freedom in their operation so that they make a stable grasp of the optical disc 10 moving into the inner/outer side of the case without interfering with a rotation of the optical disc 10. To this end, it is necessary to design a distance between the optical disc 10 and the case 1 or between the optical disc 10 and the tension arm 2a or 2b properly. When a distance between the optical disc 10 and the case 1 becomes too narrow within the case by the tension arms 2a and 2b, interference may occurs between the optical disc 10 and the case 1 in the recording/reproduction mode. In other words, if a distance between the optical disc 10 and the case 1 becomes narrow, then a mutual interference occur between the case 1 and the optical disc 10 in the recording/reproduction mode due to a sag caused by the weight of optical disc 10 or a deformation of the optical disc 10 incurring in the vibration mode according to its high-speed rotation. In this case, a normal recording/reproduction is difficult, and recording/reproducing surfaces of the optical disc 10 may be damaged by the case 1. Furthermore, if a distance between the tension arm 2a or 2b and the optical disc 10, or between the tension arm 2a or 2b and the case 1 becomes too narrow, then the tension arms 2a and 2b fails to grasp the optical disc 10 due to a mutual interference between the tension arm 2a or 2b and the case 1 or between the tension arm 2a or 2b and the optical disc 10 when the optical disc 10 within the case 1 is drawn out to the exterior. If the tension arm-disc holder 7 is compulsorily drawn out of the case 1, then the optical disc 10 or the tension arm-disc holder 7 may be damaged.

SUMMARY OF THE INVENTION

Accordingly, it is an object of the present invention to provide an optical disc cartridge which is capable of assuring the degree of freedom in a disc holder within a case.

A further object of the present invention is to provide an optical disc driving apparatus which is capable of assuring the degree of freedom in a disc holder upon loading a cartridge received with an optical disc.

In order to achieve these and other objects of the invention, an optical disc cartridge according to one aspect of the present invention includes an optical disc and a tension arm being spaced from each other into more than a minimum height for preventing their mutual interference in consideration of a thickness and a deformation amount of the optical disc; and a flange and a case are spaced from each other into more than a minimum height for preventing their mutual interference in consideration of a deformation amount of the disc holder and a thickness of the flange.

An optical disc driving apparatus according to another aspect of the present invention includes means for supporting an optical disc and an optical disc cartridge at a different height in such a manner that the optical disc and a tension arm are spaced from each other into more than a minimum height for preventing their mutual interference in consideration of a thickness and a deformation amount of the optical disc and that a flange and a case are spaced from each other into more than a minimum height for preventing their mutual interference in consideration of a deformation amount of the disc holder and a thickness of the flange.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
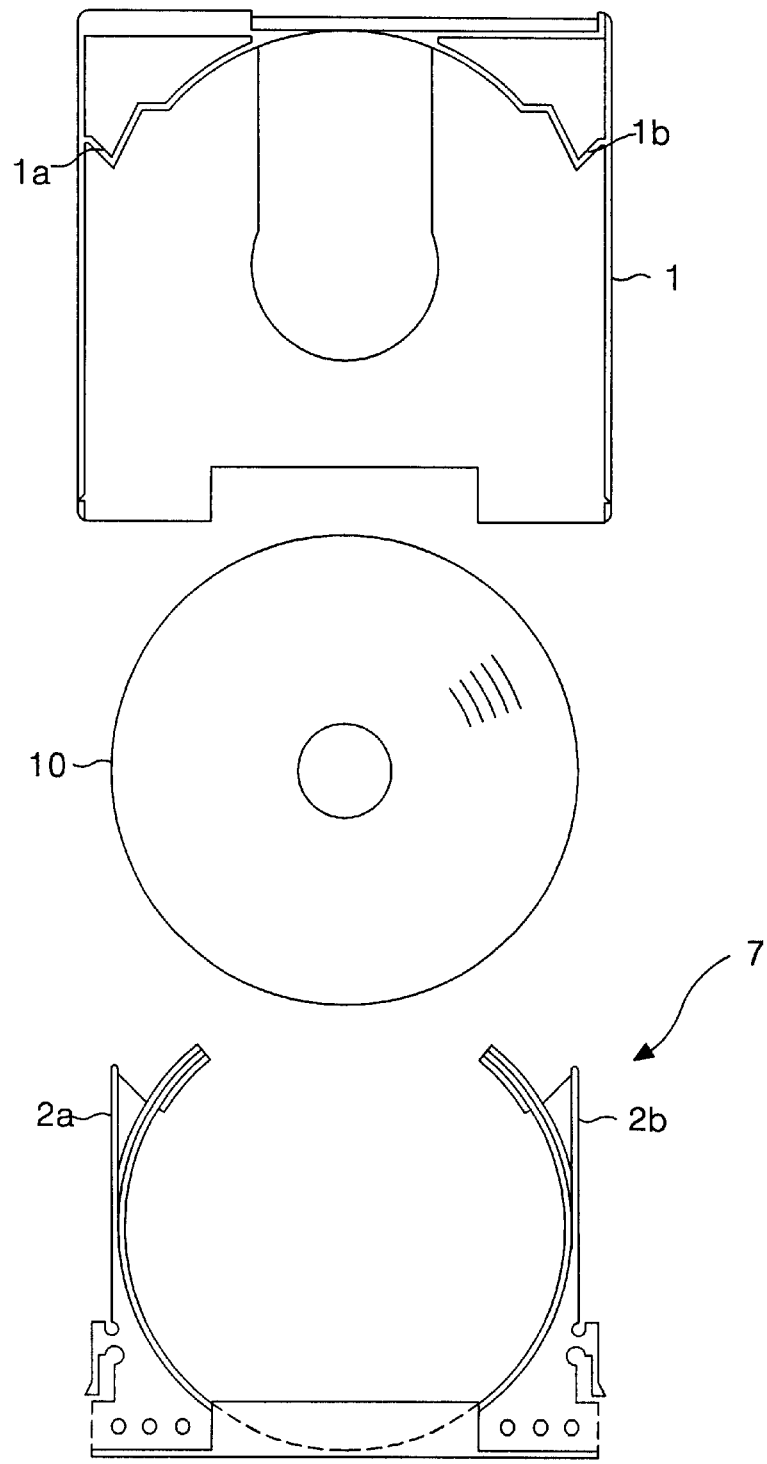
FIG. 1 is a plan view representing an optical disc cartridge mounted with a tension arm-disc holder according to a related art.
Figure 2:
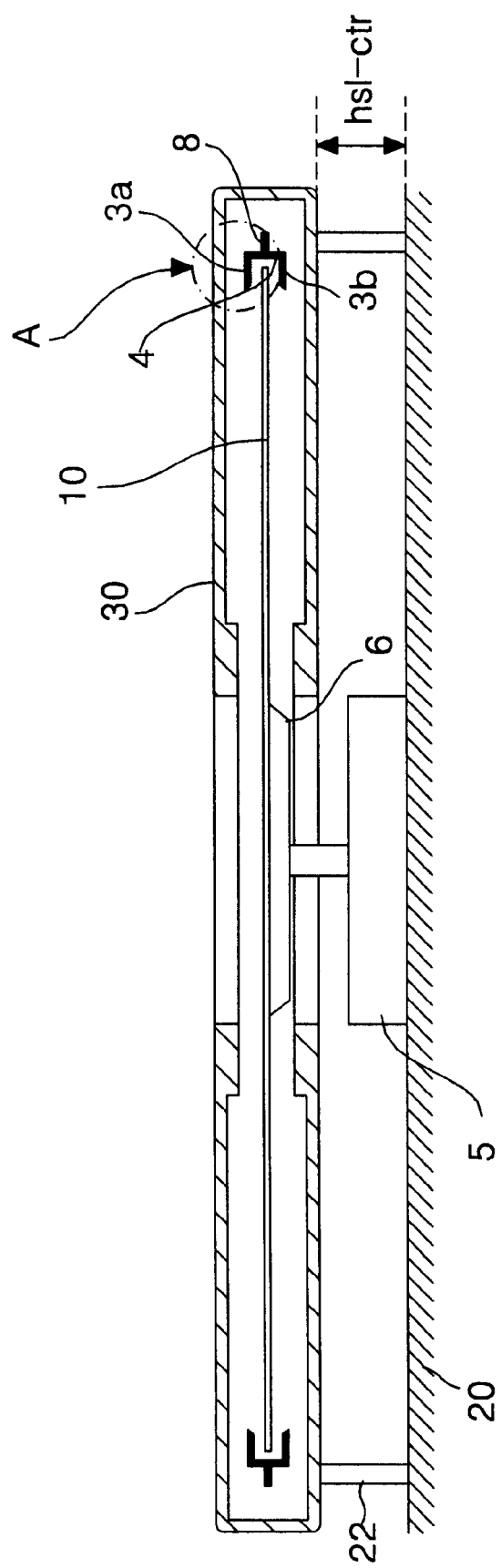
FIG. 2 is a longitudinal section view representing an optical disc cartridge and a driving apparatus thereof according to a first embodiment of the present invention.
Figure 3:
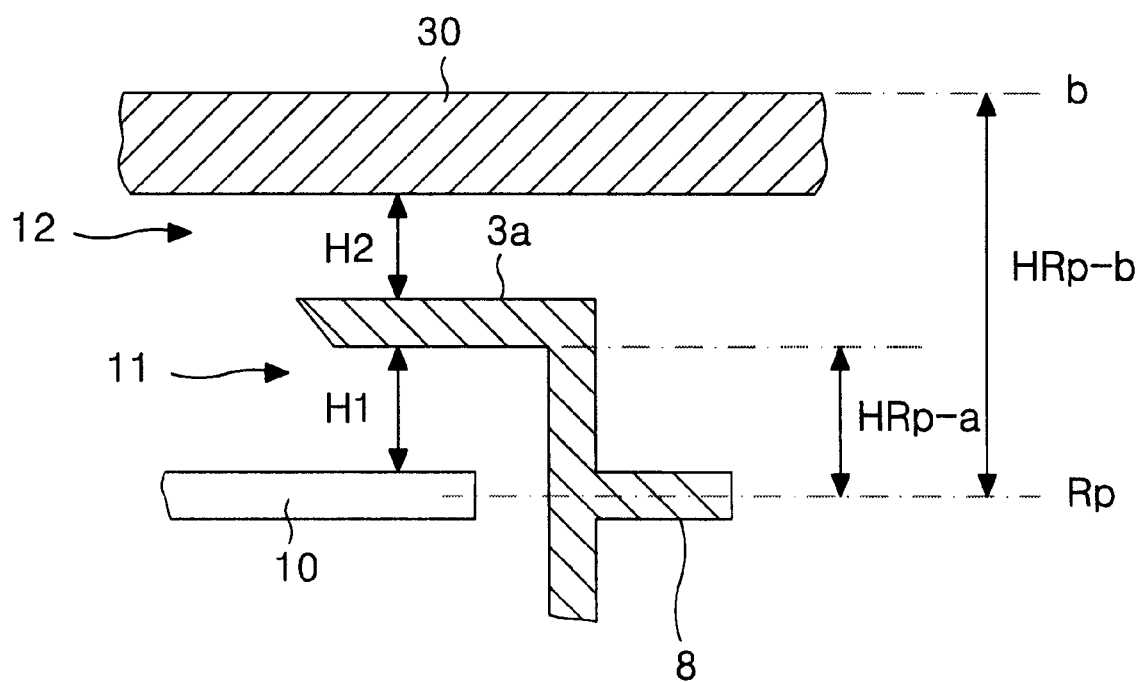
FIG. 3 is an enlarged view illustrating "A" part in FIG. 2 in detail.

Referring to FIG. 2 and FIG. 3, there is shown an optical disc cartridge according to the first embodiment of the present invention. The optical disc cartridge includes flanges 3a and 3b of an optical disc 10 and a tension arm 8 faced with having an air gap 11 more than the minimum height H1 for preventing their mutual interference which may occur in the course of rotation of the optical disc 10 therebetween, and a case 30 opposite to the flanges 3a and 3b with having an air gap 12 more than the minimum height H2 for assuring the degree of freedom on an operation of the tension arm 8. All these components are operatively coupled. The tension arm 8 is molded to surround the optical disc 10 and has a desired elastic pressure. The tension arm 8 grasps the optical disc 10 at the exterior of the case 30 to guide the optical disc 10 into the interior of the case 30; and, when a tension arm-disc holder is fully-inserted into the case 30, it is separated from the optical disc 10 while being outstretched by a guide member defined at the inner side of the case 30. The flanges 3a and 3b play a role to guide the end of the optical disc 10 into the receiving hole 4 when the tension arm 8 has captured the optical disc 10.

Such an optical disc cartridge is supported at a certain standard height (hsl-ctr) by bosses 22 secured onto a sled base 20 after being loaded within an optical disc driving apparatus. At this time, the optical disc 10 is stabbly loaded on a turntable 6 positioned over a spindle motor 5 secured onto the sled base 20 and is supported at a height corresponding to the thickness center of the case 30 at the interior of the case 30.

The optical disc 10 must be rotated in a state of not being interfered with the flanges 3a and 3b in the recording/reproduction mode. When the optical disc 10 within the case 10 draws into the exterior, the tension arm 8 must assure the degree of freedom on its operation so that it can grasp the optical disc. To this end, as shown in FIG. 3, the air gap 11 between the optical disc 10 and the upper flange 3a must have a height of at least more than H1 in consideration of the thickness and the deformation amount of the optical disc 10. Likewise, an air gap between the optical disc 10 and the lower flange 3b also has the same height H1 as the air gap 11 between the optical disc 10 and the upper flange 3a. The air gap 12 between the upper flange 3a and the upper plate of the case 30 must has a height of at least more than H2 such that a mutual interference does not occur between the upper flange 3a and the case 30. Likewise, an air gap between the lower flange 3b and the lower plate of the case 30 also has the same height H2 as the air gap 12 between the upper flange 3a and the upper plate of the case 30.

In the optical disc cartridge according to the first embodiment of the present invention as described above, the thickness of case 30 is determined after the heights H1 and H2 of the air gaps 11 and 12, respectively, was determined. Herein, it is assumed that the height H1 of the air gap 11 between the optical disc 10 and the flange 3a be a value of 0.6 mm calculated in consideration of a deformation amount of the optical disc 10 and the tension arm 8 such that a mutual interference between the optical disc 10 and the upper flange 3a does not occur. Also, it is assumed that, because the thickness of the optical disc 10 is usually 1.2 mm, but has a tolerance range of +0.3 mm, a tolerable maximum thickness Tdisc of the optical disc 10 be 1.5 mm. In this case, a height HRp-a from the center surface Rp in the thickness direction of the case 30 until the inner surface a of the upper flange 3a must be at least more than 1.5 mm as follows:

HRp-a>Tdisc+H1+Hav=1.5+0.6-0.6=1.5 mm wherein Hav represents a height from the upper surface of the optical disc 10 to the center surface Rp in the thickness direction of the case 30, assuming that the thickness of the optical disc should be an ideal value of 1.2 mm.

Meanwhile, it is assumed that a minimum thickness Tflange of the flange 3a be 0.4 mm and that the height H2 of the air gap 12 in consideration of a deformation amount of the tension arm 8 so that a mutual interference between the flange 3a and the case 30 can be prevented. When the thickness Tcase of the upper plate of the case 30 is 1.0 mm, a height HRp-b from the center surface Rp in the thickness direction of the case 30 until the outer surface of the upper plate of the case 30 must be at least more than 3.0 mm as follows:

HRp-b>HRp-a+Tflange+H2+Tcase=1.5+0.4+0.1+1.0=3.0 mm

When HRp-b is determined as seen from the equations, a total thickness of the case 30 must be at least -more than 6.0 mm because it is equal to 2HRp-b.

Otherwise, if the thickness of the optical disc cartridge is limited to less than 6.0 mm for the purpose of making a slim-type optical disc cartridge, then the thickness of the upper and lower plates of the case 30 or the thickness of the flanges 3a and 3b must be reduced so that the respective heights Hi and H2 of the air gaps 11 and 12 between the optical disc 10 and the flange 3a or 3b and between the flange 3a or 3b and the case 30 can be sufficiently assured. In this case, the optical disc driving apparatus supports the optical disc 10 and the case 30 at a proper height by a control in the height of the boss 22 and the height of the turntable 6, etc. such that a mutual interference is not generated between the optical disc 10 and the flange 3a or 3b and between the flange 3a or 3b and the case 30.

Figure 4:
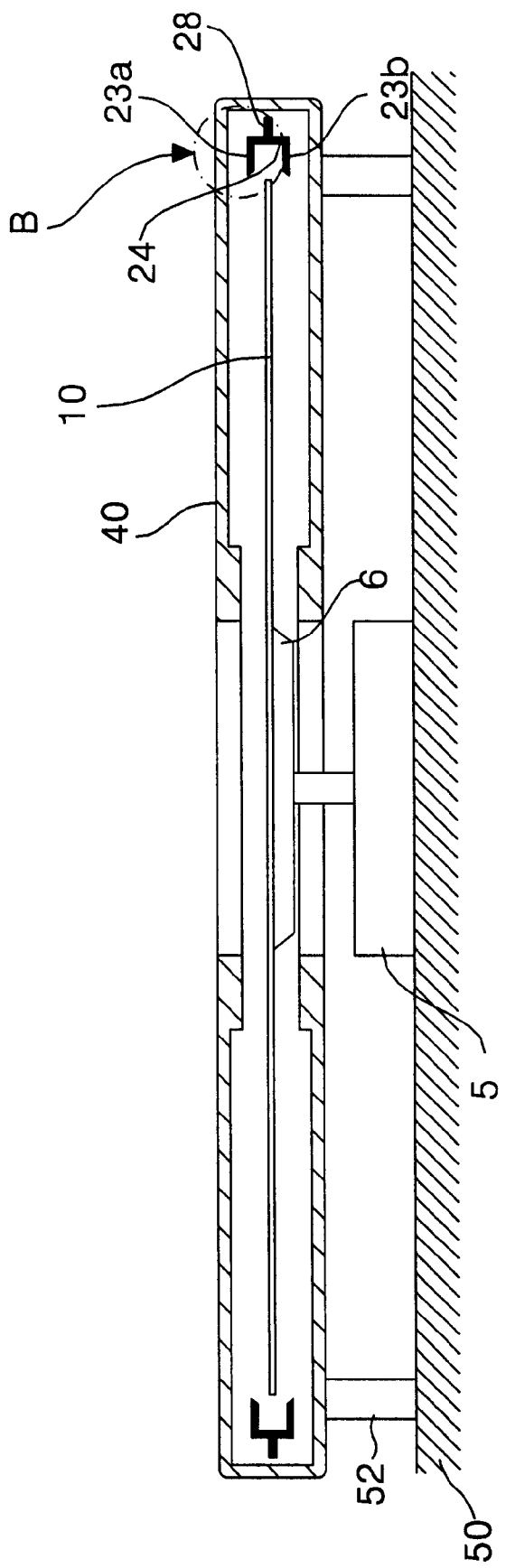
FIG. 4 is a longitudinal section view representing an optical disc cartridge and a driving apparatus thereof according to a second embodiment of the present invention.
Figure 5:
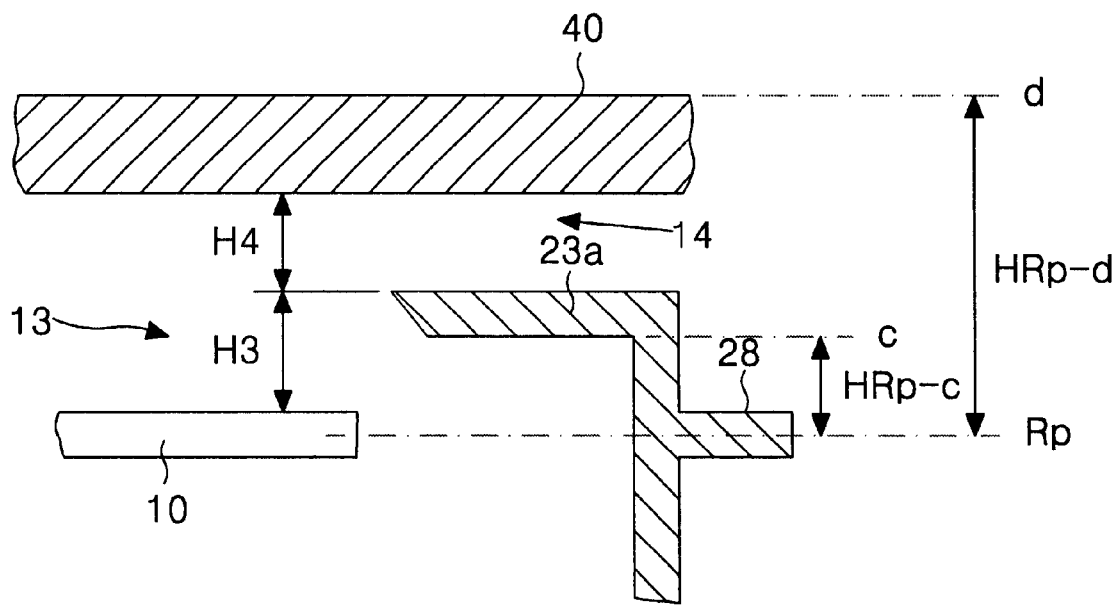
FIG. 5 is an enlarged view illustrating "B" part in FIG. 4 in detail.

FIG. 4 is a sectional view showing an optical disc cartridge and a driving apparatus thereof according to the second embodiment of the present invention, in which an optical disc has been stabbly loaded onto a turntable positioned over a spindle motor within the optical disc driving apparatus. FIG. 5 is an enlarged view of "B" part in FIG. 4.

Referring now to FIG. 4 and FIG. 5, the optical disc cartridge includes a tension arm 28 that is not overlapped with an optical disc 10 and a case 40. The tension arm 28 grasps the optical disc 10 at the exterior of the case 40 to guide the optical disc 10 into the interior of the case 40. When a tension arm-disc holder is fully inserted into the case 40, the tension arm 28 is outstretched into the outside of the optical disc 10 by a guide member defined at the interior of the case 40. In this case, the optical disc 10 and the case 40 directly face each other without having a flange 23a of the tension arm 28 overlapped therebetween and with having an air gap 13 with a desired height H3+H4 therebetween. The flanges 23a and 23b are opposed to the case 40 with having an air gap 14 therebetween. The air gap 14 between the flange 23a or 23b and the case 40 has such a sufficient height H4 that can assure the degree of freedom on their operation upon engagement of the optical disc 10 with the tension arm 28. As described above, since the tension arms 23a and 23b are not overlapped with the optical disc 10 and the case 40, a rotation of the optical disc 30 is not interfered by the tension arms 23a and 23b at the time of recording/reproduction. As a result, a smooth rotation of the optical disc within the case 40 becomes possible. In addition, the thickness reduction of the case 40 becomes possible along with assuring the degree of freedom on its operation upon engagement of the optical disc 10 with the tension arm 28.

The optical disc driving apparatus supports the optical disc 10 and the case 40 at a proper height by a control in the height of the boss 52 secured to a sled base 50 and the height of the turntable 6, etc. such that a mutual interference is not generated between the optical disc 10 and the flange 23a or 23b and between the flange 23a or 23b and the case 40.

A height HRp-c of the air gap 13 from the center surface Rp in the thickness direction of the case 40 to the inner surface c of the upper flange 23a becomes at least 1.5 mm like the height HRp-a as calculated earlier. It is assumed that a tolerable maximum thickness Tdisc of the optical disc 10 be 1.5 mm and a height H3 of the air gap 13 between the optical disc 10 and the upper flange 23a be 0.6 mm in consideration of a deformation amount of the optical disc 10 such that a mutual interference between the optical disc 10 and the upper flange 23a does not occur.

Assuming that a minimum thickness Tflange of the flange 23a be 0.4 mm, a height HRp-d of the air gap 14 from the center surface Rp in the thickness direction of the case 40 until the outer surface d of the upper plate of the case becomes 2.6 mm which subtracts the HRp-b as calculated earlier by the thickness of the flange 23a (i.e., 0.4 mm).

As described above, the optical disc cartridge according to the present invention arranges the flanges between the optical disc and the case or arranges the flanges in such a manner that the flanges are not overlapped with the optical disc and the case in consideration of the thickness of the optical disc and the flanges and the deformation amounts of the optical disc and the flanges so as to prevent a mutual interference between the optical disc and the flanges or between the flanges and the case can be prevented. Accordingly, the present optical disc cartridge sufficiently assures distances between the optical disc and the tension arm and between the optical disc and the tension arm within the case, so that it can assure the degree of freedom on an operation of disc holder.

Moreover, an optical disc driving apparatus according to the present invention controls the supporting surfaces of the cartridge and the disc upon loading the cartridge received with the disc to sufficiently assure distances between the optical disc and between the tension arm and the optical disc and the case within the cartridge case, so that it can assure the degree of freedom on an operation of disc holder.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An optical disc cartridge comprising:
   a case into which an optical disc is drawably inserted, and
   a disc holder having at least one tension arm for capturing the optical disc and at least one flange extending from the tension arm, wherein the optical disc and the tension arm are spaced from each other by more than a minimum height for preventing their mutual interference in consideration of a thickness and a deformation amount of the optical disc, the flange and the case are spaced from each other by more than a minimum height for preventing their mutual interference in consideration of a deformation amount of the disc holder and a thickness of the flange, and a vertical position of the flange with respect to the case is non-variable,
   wherein the flange extends between the optical disc and the case in a recording/reproduction mode.

2. The optical disc cartridge as claimed in claim 1, wherein a height from a center surface in a thickness direction of the case to the flange in the recording/reproduction mode is more than 1.5 mm.

3. The optical disc cartridge as claimed in claim 1, wherein the tension arm and the flange are moved into an edge area of the case in the recording/reproduction mode in such a manner that the tension arm and the flange are positioned in a space between the optical disc and the case without contacting the optical disc and the case.

4. The optical disc cartridge as claimed in claim 3, wherein a thickness of the case is more than 5.2 mm.

5. The disc cartridge as claimed in claim 1, wherein the disc holder including the tension arm and the flange is slidable in and out of the case.

6. The disc cartridge as claimed in claim 1, wherein a height HRp-a from a center line of the case to an inner surface of the flange corresponds to the following equation:

$$HR_{p-a} > T_{disc} + H1 + Hav$$

where $T_{disc}$ is a tolerable maximum thickness of the disc, H1 is said minimum height associated with the optical disc and the flange, and Hav is a height in a negative value from an upper surface of the disc to the center line of the case.

7. The optical disc cartridge as claimed in claim 1, wherein the flange has an L-shape.

8. A disc cartridge for receiving a disk, comprising:
   a case into which the disk is slidably insertable; and
   a disc holder including at least one tension arm for capturing the disc and at least one flange extending from the tension arm, wherein the disk and the tension arm are spaced from each other by more than a first minimum height for preventing interference between the disk and the flange, the flange and the case are spaced from each other by more than a second minimum height for preventing interference between the flange and the case, and a vertical position of the flange is non-variable with respect to the case,
   wherein the flange extends between the disk and the case in a recording/reproduction mode.

9. The disc cartridge as claimed in claim 8, wherein the disc holder including the tension arm and the flange is slidable in and out of the case.

10. The disc cartridge as claimed in claim 8, wherein a height HRp-a from a center line of the case to an inner surface of the flange corresponds to the following equation:

$$HR_{p-a} > T_{disc} + H1 + Hav$$

where $T_{disc}$ is a tolerable maximum thickness of the disc, H1 is said first minimum height, and Hav is a height in a negative value from an upper surface of the disc to the center line of the case.

11. The disc cartridge as claimed in claim 8, wherein the flange has an L-shape.

12. A disc cartridge for receiving a disc, comprising:
   a case for receiving the disc; and
   a disc holder including at least one tension arm for capturing the disc and at least one flange extending from the tension arm, wherein the disk and the tension arm are spaced from each other by more than a minimum height for preventing interference between the disk and the flange, the flange and the case are spaced from each other by more than a minimum height for preventing interference between the flange and the case, and the flange extends between the disc and the case in a recording/reproduction mode.

13. The disc cartridge as claimed in claim 12, wherein a vertical position of the flange with respect to the case is fixed.

14. The disc cartridge as claimed in claim 12, wherein the disc holder including the tension arm and the flange is slidable in and out of the case.

15. The disc cartridge as claimed in claim 12, wherein a height HRp-a from a center line of the case to an inner surface of the flange corresponds to the following equation:

$$HR_{p-a} > T_{disc} + H1 + Hav \qquad 5$$

where $T_{disc}$ is a tolerable maximum thickness of the disc, H1 is said minimum height associated with the optical disc and the flange, and Hav is a height in a negative value from an upper surface of the disc to the center line of the case.

16. The disc cartridge as claimed in claim 12, wherein the flange has an L-shape.

17. An optical disc cartridge comprising:

a case into which an optical disc is drawably inserted, and a disc holder having at least one tension arm for capturing the optical disc and at least one flange extending from the tension arm, wherein the optical disc and the tension arm are spaced from each other by more than a minimum height for preventing their mutual interference in consideration of a thickness and a deformation amount of the optical disc, the flange and the case are spaced from each other by more than a minimum height for preventing their mutual interference in consideration of a deformation amount of the disc holder and a thickness of the flange, and a vertical position of the flange with respect to the case is non-variable, wherein the tension arm and the flange are moved into an edge area of the case in a recording/reproduction mode in such a manner that the tension arm and the flange are positioned in a space between the optical disc and the case without contacting the optical disc and the case.

\* \* \* \* \*